United States Patent
Goudal

(10) Patent No.: US 6,328,177 B2
(45) Date of Patent: *Dec. 11, 2001

(54) WALL RECESSIBLE BOX FOR ELECTRICAL APPARATUS

(75) Inventor: Jean-Paul Goudal, Limoges (FR)

(73) Assignees: Legrand; Legrand SNC, both of Limoges (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,905

(22) Filed: Jan. 26, 1999

(30) Foreign Application Priority Data

Jan. 27, 1998 (FR) .................................... 98 00835

(51) Int. Cl.$^7$ ...................................... H02G 3/08
(52) U.S. Cl. .............................. 220/3.5; 174/48; 220/3.6; 220/3.94; 248/27.3
(58) Field of Search ............................. 220/3.2, 3.5, 3.6, 220/787, 789, 3.3, 3.4, 3.9, 3.94, 8; 248/27.3; 174/153 G, 138 R, 135, 153 R, 656, 48, 49, 58, 63; D26/74; 411/947

(56) References Cited

U.S. PATENT DOCUMENTS

| | | | |
|---|---|---|---|
| 3,168,613 | * 2/1965 | Palmer | ................................ 220/3.94 |
| 3,213,189 | 10/1965 | Mitchell et al. . | |
| 3,611,861 | * 10/1971 | Schulze | ................................ 411/508 |
| 3,749,873 | * 7/1973 | Harper et al. | ................. 220/3.6 X |
| 3,848,764 | * 11/1974 | Salag | ................................ 220/3.6 |
| 4,406,936 | * 9/1983 | Ohashi | .......................... 248/27.1 X |
| 4,620,641 | * 11/1986 | Beer | ................................ 220/787 X |
| 4,687,164 | * 8/1987 | Bakhaus et al. | ..................... 248/27.3 |
| 4,801,040 | * 1/1989 | Kraus | ................................ 220/787 |
| 4,913,385 | * 4/1990 | Law et al. | .................... 174/153 G X |
| 4,927,287 | * 5/1990 | Ohkawa et al. | .................. 403/408.1 |
| 5,044,985 | * 9/1991 | Sheen | .............................. 248/27.3 X |
| 5,129,768 | * 7/1992 | Hoyle et al. | .......................... 411/182 |
| 5,288,189 | * 2/1994 | Hepworth | .............................. 411/32 |
| 5,499,737 | * 3/1996 | Kraus | ................................ 220/787 |

FOREIGN PATENT DOCUMENTS

| | | |
|---|---|---|
| 4020676 | 1/1992 | (DE) . |
| 4342512 | 6/1995 | (DE) . |
| 1187189 | * 9/1959 | (FR) ...................................... 220/3.3 |
| WO 91/10071 | 7/1991 | (WO) . |
| 9516295 | 6/1995 | (WO) . |

\* cited by examiner

Primary Examiner—Stephen P. Garbe
Assistant Examiner—Joseph C. Merek
(74) Attorney, Agent, or Firm—Young & Thompson

(57) ABSTRACT

A box, in particular for electrical devices, is built into a wall of any kind by fitting into an opening therein. The box includes a transverse flange which bears in the manner of a guard against the wall to be equipped and, beyond the flange, at least one elastically deformable lug projecting laterally to cooperate with the wall. The elastically deformable lug has two branches with a common root and extending in respective different directions, namely, referred to the insertion direction, a first or front branch extending globally away from the flange and a second or rear branch extending globally towards the flange. Applications include electrical devices, for example infrared radiation receiving cells.

17 Claims, 2 Drawing Sheets

WALL RECESSIBLE BOX FOR ELECTRICAL APPARATUS

BACKGROUND OF THE INVENTION

1. Field of the Invention

The present invention is generally concerned with boxes used to accommodate a device of any kind, for example an electrical device of any kind, for example an infrared receiving cell, and designed to be built into a wall of any kind by fitting into an opening provided in the wall for this purpose.

The wall to be equipped can be a suspended ceiling, for example.

It can also be a hollow partition wall, of the type usually called a dry wall, for example.

It can also be part of trunking of any kind.

Finally, and more generally, it can be formed by any kind of support, for example a simple metal plate, for example a closure to be attached to any of the kinds of wall previously referred to.

2. Description of the Prior Art

The present invention is more particularly directed to the situation in which the box to be built into a wall of the above kind has a transverse flange adapted to bear against the wall in the manner of a guard and, beyond the flange, at least one elastically deformable lug projecting laterally to cooperate with the wall concerned to retain the box.

In practice two elastically deformable lugs are usually provided, at diametrally opposite positions.

At present, the elastically deformable lugs usually extend in the opposite direction to the flange, in particular to facilitate removal of the box.

They then interengage with the edge surface of the opening through which they pass with a simple friction effect.

Although this is satisfactory for relatively thick walls, i.e. walls such as suspended ceilings that have a thickness in the order of 20 mm to 30 mm, it is unsatisfactory for thinner walls, i.e. walls like those of trunking of any kind, for example, or of a metal plate of any kind, having a thickness less than 3 mm.

A general aim of the present invention is a device that is satisfactory in either case.

SUMMARY OF THE INVENTION

To be more precise, the present invention consists in a box, in particular for electrical devices, adapted to be built into a wall of any kind by fitting into an opening therein, the box being of the kind including a transverse flange adapted to bear in the manner of a guard against the wall and, beyond the flange, at least one elastically deformable lug projecting laterally to cooperate with the wall, wherein the elastically deformable lug has two branches with a common root and extending in respective different directions, namely, referred to the insertion direction, a first or front branch extending globally away from the flange and a second or rear branch extending globally towards the flange.

Accordingly, if the wall is relatively thick, it is the front branch of an elastically deformable lug of the above kind that is operative by friction, as previously, bearing against the edge surface of the wall.

However, if the wall is relatively thin its rear branch is operative.

In accordance with the invention the rear branch is then braced against the inside edge of the opening in the wall.

Arrangements described in detail hereinafter make it possible to remove the box in this case, however.

The features and advantages of the invention will become more apparent from the following description given by way of example with reference to the accompanying diagrammatic drawings.

DETAILED DESCRIPTION OF THE PREFERRED EMBODIMENTS

Figure 1:
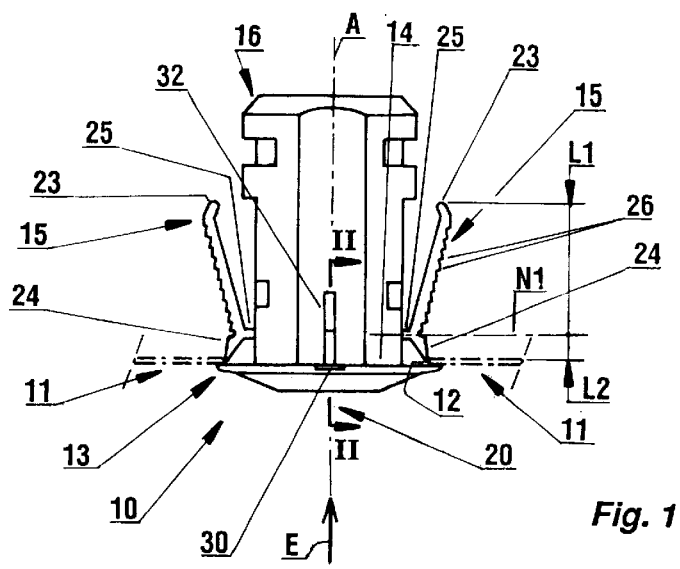
FIG. 1 is an elevation view of a box in accordance with the invention.
Figure 2:
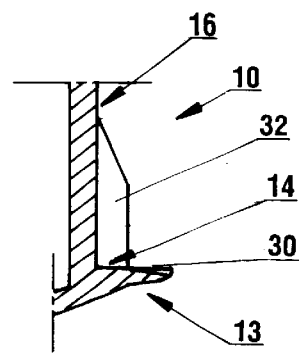
FIG. 2 is a fragmentary view to a larger scale in axial section taken along the line II—II in FIG. 1.
Figures 5A, 5B, 5C:
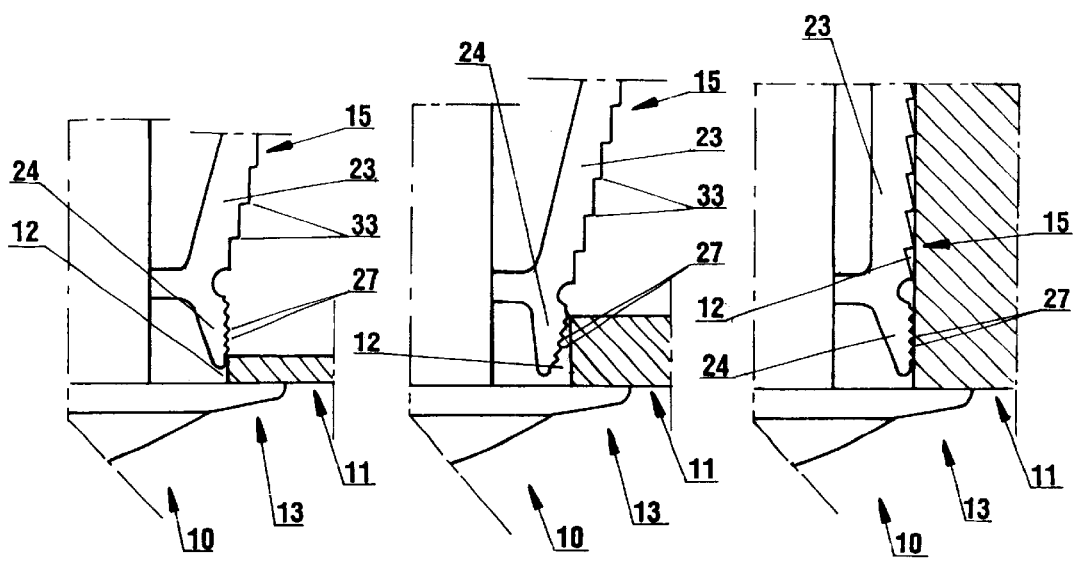
FIGS. 5A, 5B, 5C are partial views to a different scale, in elevation and section, deduced from that of FIG. 1, one of them showing various modes of operation of the elastically deformable lugs equipping the box in accordance with the invention according to the thickness of the wall.

As shown schematically in chain-dotted outline in FIG. 1, and as shown in part in continuous line in FIGS. 5A, 5B and 5C, the box 10 in accordance with the invention is designed to be built into any kind of wall 11 simply by fitting into an opening 12 provided for this purpose in the wall.

In a manner that is known in itself, the box 10 includes a flange 13 transverse to its axis A to bear like a guard against the wall 11 to which it is to be fitted and the front surface 14 of which, referred to the direction E of insertion into the wall 11, shown by an arrow in FIG. 1, is substantially plane for this purpose in the embodiment shown, and beyond the flange 13 in the insertion direction E at least one elastically deformable lug 15 projecting laterally, substantially in a diametral plane of the box, to cooperate with the wall 11 to retain the box.

As shown here, the box 10 in accordance with the invention in practice has two elastically deformable lugs 15 in diametrally opposite positions.

In practice, the elastically deformable lugs 15 project from a globally cylindrical body 16 set back from the periphery of the flange 13.

Figure 3:
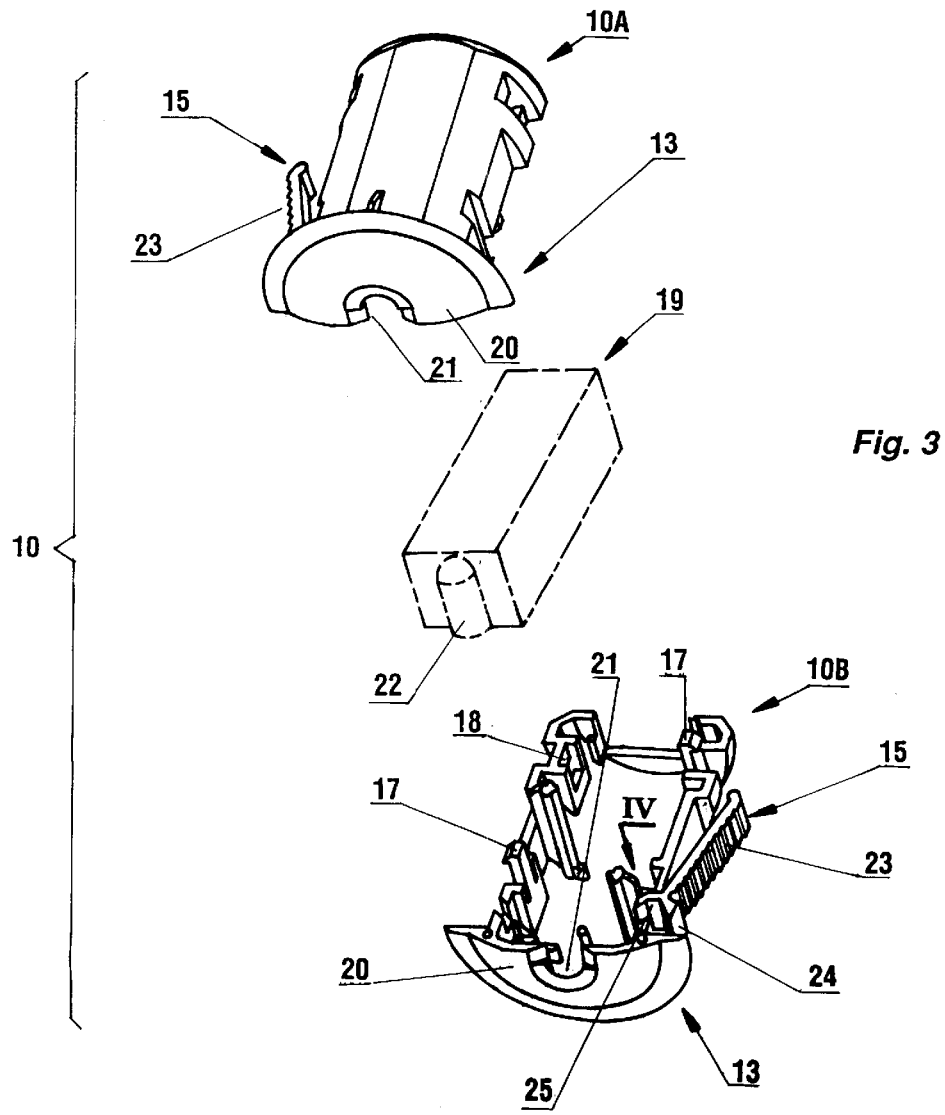
FIG. 3 is an exploded perspective view including the contour of the device to be housed.

In the embodiments shown, and as seen more clearly in FIG. 3, the box 10 of the invention is formed of two identical shells 10A, 10B each having one elastically deformable lug 15 and offered up to each other face-to-face in a diametral plane.

The corresponding structural features are well known to the skilled person and will not be described in detail here.

Suffice to say that in the embodiments shown the shells 10A, 10B each comprise two clipping lugs 17 substantially perpendicular to their front plane and, in corresponding relationship to the clipping lugs 17, two detents 18 adapted to engage the clipping lugs 17 hook-fashion and only one of which can be seen in FIG. 3.

The assembly of the two shells 10A, 10B is therefore hermaphroditic, as it were, each of the clipping lugs 17 of one engaging the corresponding detent 18 of the other, and vice versa.

Finally, in a manner that is known in itself, the box 10 of the invention is hollow to house a device 19 of any kind, the contour of which is shown in chain-dotted line in FIG. 3.

As the device 19 is not relevant to the present invention, it will not be described here.

It is an electrical device, for example.

To be more precise, it can be an infrared radiation receiving cell, for example.

Be this as it may, in the embodiments shown, the box 10 of the invention has an axial opening 21 in the central area of its front wall 20 enabling a part 22 of the device 19 to emerge to the exterior.

In accordance with the invention each of the elastically deformable lugs 15 for retaining the box 10 to the wall 11 has two branches 23, 24 with a common root 25 and extending in respective different directions, namely, referred to the insertion direction E, a first or front branch 23 extending globally away from the flange 13 and a second or rear branch 24 extending globally towards the flange 13.

Figures 4, 6:
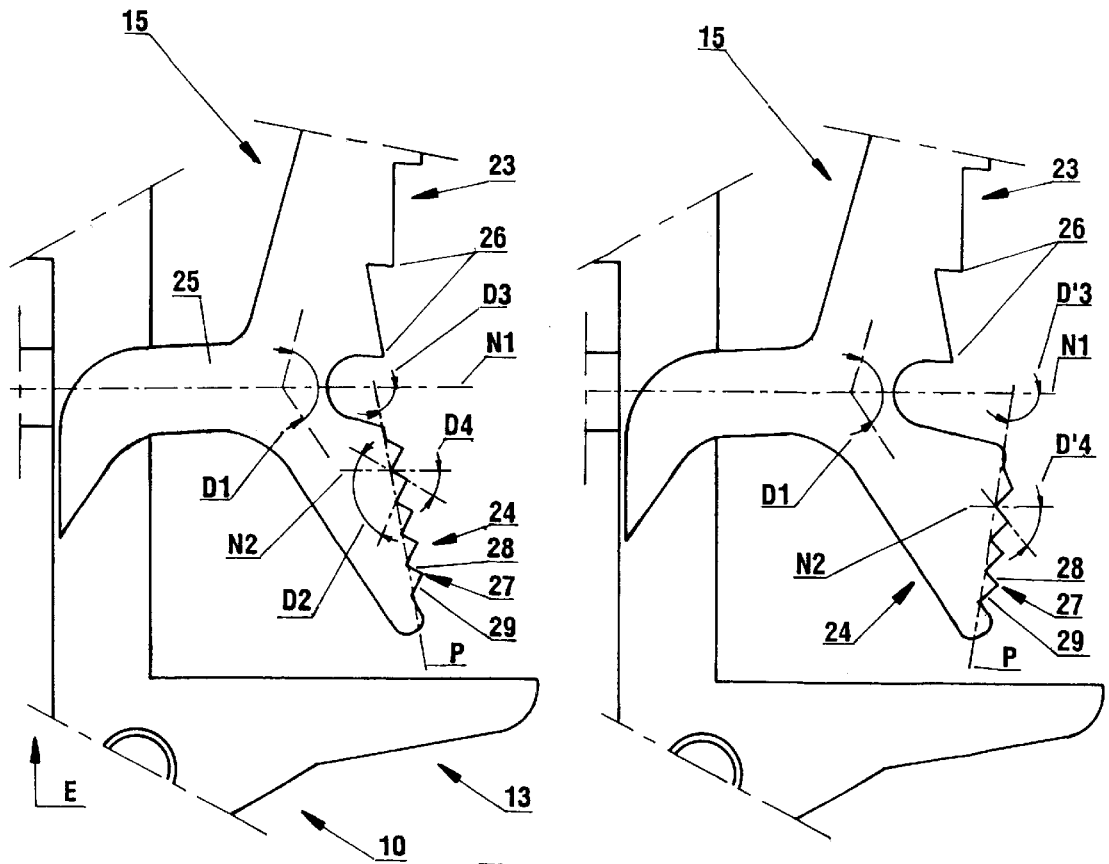
FIG. 4 is a partial plan view to a larger scale and in the direction of the arrow IV in FIG. 3 of one of the shells constituting the box.
FIG. 6 is a partial plan view analogous to that of FIG. 4 and relating to a different embodiment.

In the embodiments shown, the root 25 common to the two branches 23, 24 is substantially in a plane $N_1$ normal to the axis A (FIG. 4).

Moreover, in these embodiments, the two branches 23, 24 are both slightly oblique to the axis A and, considering them as reduced to their respective lengthwise directions, they globally form between them, as shown diagrammatically in chain-dotted line in FIG. 4, a dihedron $D_1$, the concave side of which faces outwards and the angle of which is less than 180°, for example in the order of 120° to 140°.

In practice, the length $L_2$ of the rear branch 24, measured, for convenience only, projected onto a normal to the plane $N_1$, for example, as shown in FIG. 1, is merely a fraction of the length $L_1$ of the front branch 23 measured similarly.

This fraction is less than one quarter, for example.

In practice, the rear branch 24 terminates at a distance from the flange 13, to be more precise at a distance from its front surface 14.

In the embodiments shown, the front branch 23 of each of the elastically deformable lugs 15 has regularly spaced detents 26 projecting transversely from its outside face.

As shown here, for example, they are preferably asymmetric detents like ratchet teeth with the steeper front side facing towards the flange 13.

As in the embodiments shown here, the rear branch 24 of each of the elastically deformable lugs 15 preferably has regularly spaced detents 27 also projecting transversely from its outside surface.

However, unlike the detents 26 on the front branch 23, these detents are preferably globally symmetrical.

The detents 27, which are all identical to each other, in practice all project from the same base plane P shown diagrammatically in chain-dotted line in FIGS. 4 and 6.

Finally, arrangements are preferably provided to facilitate removal of the box 10 in accordance with the invention, if necessary.

These arrangements include the profile of the detents 27 and/or their location when unstressed.

In the embodiments shown, the front flank 28 and the rear flank 29 of the detents 27 in the insertion direction E form a dihedron $D_2$ between them at an angle of around 90°.

In the embodiment more particularly shown in FIGS. 1 to 4, the base plane P from which they all project forms an acute angle dihedron $D_3$ with the plane $N_1$ which, passing through the root 25 of the two branches 23, 24, is normal to the axis A.

Conjointly, the front flank 28 of the detents 27 forms, with a plane $N_2$ normal to the axis A, a dihedron $D_4$, the angle of which when unstressed is less than 45°.

The arrangements intended to facilitate removal of the box 10 in accordance with the invention, if necessary, also include the fact that, in the embodiments shown, the flange 13 of the box 10 has at least one notch 30 opening onto its periphery recessed into its rear surface 14 in the insertion direction E at a distance from the elastically deformable lugs 15.

In practice, in the embodiments shown, the flange 13 has two notches 30 diametrically opposite each other and 90° offset from the elastically deformable lugs 15.

Moreover, in these embodiments the notches 30 extend only part of the width of the front surface 14 of the flange 13 and a stiffening rib 32 covers the remainder of that width, contiguous with the body 16 of the box 10 and extending a fraction of the height of the box starting from its flange 13.

To use the box 10 in accordance with the invention, all that is required is to insert it into the opening 12 in the wall 11 to be equipped, as mentioned above.

If the wall 11 is relatively thin, for example if its thickness is less than 3 mm, then the box 10 is retained exclusively by the rear branch 24 of its elastically deformable lugs 15, as shown in the case of one of them in FIGS. 5A and 5B.

For a very thin wall 11 (FIG. 5A) the rear branch 24 is operative through one or the other of its rear detents 27.

If the wall 11 is slightly thicker (FIG. 5B) it is operative through one or the other of its front detents 27.

For an intermediate thickness of the wall 11, one or other of the detents 27 in its middle part is operative.

However, in all cases, the rear branch 24 of the elastically deformable lugs 15 of the box 10 in accordance with the invention is operative in the manner of a buttress.

If, as shown in FIG. 5C, the wall 11 to be equipped is significantly thicker, for example 20 mm to 30 mm thick, the elastically deformable lugs 15 of the box 10 in accordance with the invention are operative through their rear branch 24 and through their front branch 23, and the latter are then operative by friction, bearing on the edge surface of the opening 12 in the wall 11.

In all cases, to remove the box 11, if necessary, all that is required is to insert the blade of a screwdriver between its flange 13 and the wall 11, through a notch 30 in the flange 13, and to use the screwdriver blade to apply leverage, bearing down on the wall 11.

In the embodiments shown in FIG. 6 the base plane P from which the detents 27 of the rear branch 24 of the elastically deformable lugs 15 project forms an obtuse angle dihedron $D'_3$ with the plane $N_1$, which, passing through the root 25 of the two branches 23, 24 of the elastically deformable lugs 15, is normal to the axis A, and, conjointly, the forward flank 28 of the detents 27 forms, with the plane $N_2$ normal to the axis A, a dihedron $D'_4$, the angle of which when unstressed is greater than 45°.

As previously, these arrangements facilitate removal of the box 10.

Of course, the present invention is not limited to the embodiments described and shown but encompasses any variant execution and/or combination of their various component parts.

What is claimed is:

1. A box for housing an electrical apparatus and adapted to be fitted into a hole in a wall, said box comprising:

a body with a longitudinal axis and a flange proximate one longitudinal end of said body, said flange extending in a plane transverse to the longitudinal axis and being adapted to bear on an outer side of a wall into which said box is fitted; and at least one elastically deformable lug laterally projecting from said body at a position closer to the transverse plane than to a second longitudinal end of said body, said lug having a single root and two branches extending from said single root in generally opposed longitudinal directions therefrom, a first one of said branches having a free end extended longitudinally away from the transverse plane and a second one of said branches having a free end extended longitudinally toward the transverse plane and being shorter than said first one of said branches, at least one of said branches being engageable with a wall into which the box is fitted depending on a thickness of the wall.

2. A box according to claim 1, wherein said second branch alone is cooperable with thin wall.

3. A box according to claim 1, wherein said second branch alone is cooperable with thin and medium thick walls.

4. A box according to claim 1, wherein both said first and second branches are cooperable with a thick wall.

5. A box according to claim 1, wherein said first and second branches are both oblique with respect to the longitudinal axis of the box and define therebetween an outwardly converging a dihedral angle less than 180°.

6. A box according to claim 1, wherein said second branch has a length substantially shorter than the length of the first branch.

7. A box according to claim 1, wherein a free end of said second branch is longitudinally spaced from a rear face of said flange.

8. A box according to claim 1, wherein said second branch has a wall engagement surface including a plurality of detents.

9. A box according to claim 8, wherein said detents have a front flank and a rear flank defining a dihedral angle of about 90° therebetween.

10. A box according to claim 8, wherein said detents have a common base plane, said common base plane defining an acute angle dihedron with a plane passing through said root of said elastically deformable lug and a normal to the longitudinal axis of the box.

11. A box according to claim 10, wherein a front flank of said detents forms with a plane normal to the longitudinal axis of the box a dihedral angle less than 45° when the lug is unstressed.

12. A box according to claim 8, wherein said detents all project from a common base plane and said base plane defines an obtuse dihedral angle with a plane passing through the root of said elastically deformable lug and normal to a longitudinal axis of the box.

13. A box according to claim 12, wherein a front flank of said detents forms with a plane normal to the longitudinal axis of the box a dihedral angle greater than 45° when said lug is unstressed.

14. A box according to claim 1, wherein said root lies substantially in a plane normal to the longitudinal axis of the body of said box.

15. A box according to claim 1, wherein said flange has at least one notch opening onto a peripheral portion of the flange and recessed in a rear surface of said flange and spaced longitudinally from said at least one elastically deformable lug.

16. A box according to claim 1, wherein two said deformable lugs are provided, said deformable lugs being disposed diametrically opposite each other relative to a longitudinal axis of said box, said flange having two notches diametrically opposite each other, opening onto a rear surface of said flange and angularly offset from and longitudinally spaced from said elastically deformable lugs.

17. A box according to claim 15, comprising a pair of substantially identical shells arranged face to face, each of said shells having integrally formed therewith a said elastically deformable lug.

* * * * *